(12) United States Patent
Shah

(10) Patent No.: US 11,227,711 B2
(45) Date of Patent: Jan. 18, 2022

(54) FLUID FLOW CONTROL VALVE WITH SWIVELED AND COMPENSATED STROKE

(71) Applicant: ROTEX Manufacturing and Engineers Private Limited, Mumbai (IN)

(72) Inventor: Amit Shah, Mumbai (IN)

(73) Assignee: ROTEX Manufacturing and Engineers Private Limited, Mumbai (IN)

(*) Notice: Subject to any disclaimer, the term of this patent is extended or adjusted under 35 U.S.C. 154(b) by 0 days.

(21) Appl. No.: 16/941,827

(22) Filed: Jul. 29, 2020

(65) Prior Publication Data
US 2021/0391104 A1 Dec. 16, 2021

(30) Foreign Application Priority Data
Jun. 16, 2020 (IN) .............................. 202021025292

(51) Int. Cl.
| | |
|---|---|
| *F16K 31/06* | (2006.01) |
| *H01F 7/08* | (2006.01) |
| *H01F 7/126* | (2006.01) |
| *H01F 7/02* | (2006.01) |
| *F16K 31/08* | (2006.01) |

(Continued)

(52) U.S. Cl.
CPC ......... *H01F 7/081* (2013.01); *F16K 31/0655* (2013.01); *F16K 31/082* (2013.01); *F16K 31/10* (2013.01); *F16K 31/105* (2013.01); *H01F 7/02* (2013.01); *H01F 7/064* (2013.01); *H01F 7/066* (2013.01); *H01F 7/126* (2013.01)

(58) Field of Classification Search
CPC ............. F16K 31/0655; F16K 31/0682; F16K 31/0696; F16K 31/08; F16K 31/082; F16K 31/084; F16K 31/10; F16K 31/105; H01F 7/066; H01F 7/126; F15B 13/0446; F15B 2013/0448; Y10T 137/87748; Y10T 137/87756
See application file for complete search history.

(56) References Cited

U.S. PATENT DOCUMENTS 5,293,144 A * 3/1994 Krimmer ................. F02M 3/07
335/229
5,370,361 A * 12/1994 Mendell ................... F16K 1/22
251/305

(Continued)

*Primary Examiner* — Matthew W Jellett

(57) ABSTRACT

A fluid flow control valve with swiveled & compensated stroke (100) comprising a solenoid coil assembly (60), a permanent magnet (181), a bridge mounted solenoid assembly (120), a compensated swivel fulcrum (150), a counterweight arrangement (160), and a base unit arrangement (180), wherein a slender cylindrical rod (70) of the compensated swiveled fulcrum (150) is non-rotatably trapped in a fulcrum receptacle (33) of a bridge (30), a compensating spring (85) continuously presses a pair of the plurality of spherical balls (80) against a conical surface (72) of the lender cylindrical rod (70), the bridge mounted solenoid assembly (120) swivels around an axis (121), an electric supply impressed at the electrical terminals of the solenoid coil assembly (60) generates a magnetic field and the solenoid coil assembly (60) moves in an arc (61), the swiveled valve with the compensated precision stroke (100) is mountable in any orientation. Such a valve is a small pre-stage valve with a sub-millimeter stroke, to a big valve of high energy.

12 Claims, 19 Drawing Sheets

(51) Int. Cl.
*F16K 31/10* (2006.01)
*H01F 7/06* (2006.01)

(56) References Cited

U.S. PATENT DOCUMENTS

| | | | | |
|---|---|---|---|---|
| 6,311,951 B1 * | 11/2001 | Samulowitz | ........ | F16K 31/0682 |
| | | | | 251/129.16 |
| 6,726,173 B2 * | 4/2004 | Hettinger | ............ | F16K 31/0641 |
| | | | | 251/129.17 |
| 7,252,114 B2 * | 8/2007 | Wygnanski | ......... | F16K 31/0682 |
| | | | | 137/625.44 |
| 8,777,180 B2 * | 7/2014 | Doerr | .................. | F16K 31/0682 |
| | | | | 251/129.09 |
| 9,091,368 B2 * | 7/2015 | Scheibe | ................... | F16K 31/52 |
| 9,856,993 B2 * | 1/2018 | Fuchs | ................... | F16K 31/082 |
| 10,830,369 B2 * | 11/2020 | Herrig | ..................... | F16K 31/06 |
| 2015/0069860 A1 * | 3/2015 | Reiter | ................... | F04B 19/006 |
| | | | | 310/12.16 |

* cited by examiner

Figure 6C
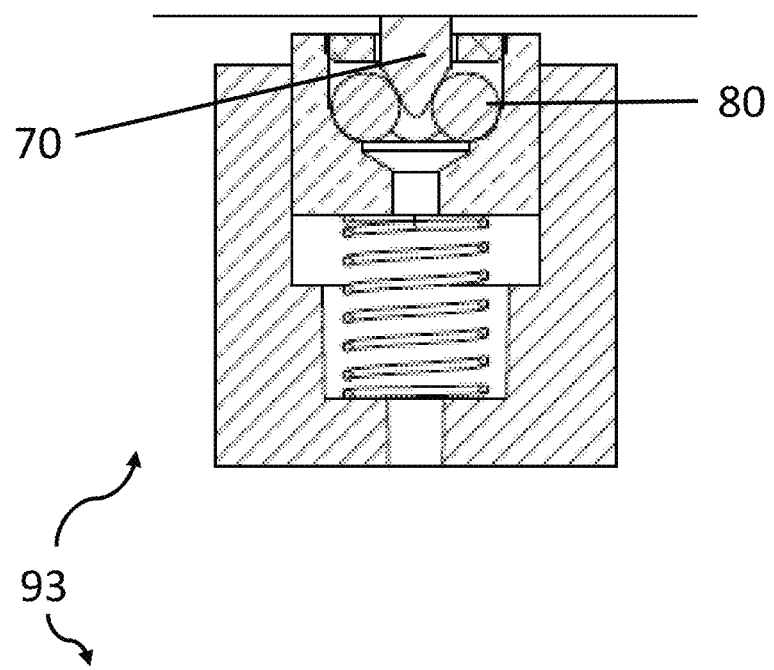
93
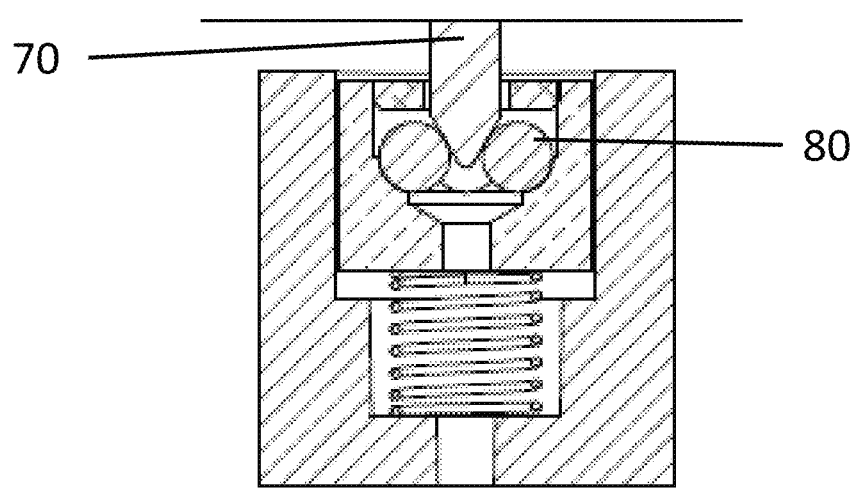
Figure 6D

FLUID FLOW CONTROL VALVE WITH SWIVELED AND COMPENSATED STROKE

FIELD OF THE INVENTION

The present invention relates to flow control valves, particularly precision valves. Such small valves are particularly used in positioners and elsewhere in big valves when a precision functioning of higher order is needed.

BACKGROUND OF THE INVENTION

Fluid flow control valves, simply referred as valves hereinafter, are a well-established electromechanical device, used in almost every process industry. Various types of valves such as ball valve, butterfly valve, diaphragm valve are known.

Control valves are normally fitted with valve actuators and along with positioners.

Size of valves, generally referred to as a flange size, based on size of corresponding pipeline, varies from more than a meter to less than a millimeter.

Patent application Number 3562/DELNP/2014 discloses a method and system for controlling the actuator of a small opening and regulated delivery valve in the context of control of the actuator of an air intake valve.

Such two-stage valve arrangements are also deployed in electro-pneumatic positioners. WO2014/131427A1 discloses a pilot stage valve that is arranged to translate discrete valued electrical signal into binary values pneumatic signal. U.S. Pat. No. 5,699,824 discloses an electrical-pneumatic system with objective of reduced electrical energy consumption.

For such applications involving a pre-stage valve operating a bigger valve, or otherwise, there are disclosed low powered solenoid actuated valves as in US2016/0186882A1. However, there exists a gap in technology with respect to small valves with minimal energy and maximum precision in real-time varying situation of wear and temperature variation, which the present invention fulfills.

Importantly, inventive concepts for small size valves generally do not benefit large size valves, which the present invention also addresses.

OBJECTIVES

The objective is to invent a pre-stage electro-pneumatic valve that is immune to wear of moving mechanical components.

Another objective is to invent a pre-stage electro-pneumatic valve that is suitable for precise sub-millimeter travel of valve stroke consistently.

Yet another objective is to invent a pre-stage electro-pneumatic valve that requires minimum electrical energy.

Yet another objective is to invent a pre-stage electro-pneumatic valve that is operationally immune to temperature variations.

Yet another objective is to invent a valve that requires minimal operational energy per unit size of the valve and the design is scalable from a low energy to a high energy device.

SUMMARY OF INVENTION

The present invention is a swiveled valve driven by a non-linear solenoid. The preferred embodiment described is a pre-stage valve wherein a closing to opening stroke travel of orifice of the pre-stage valve is less than half a millimeter.

Person skilled in the art can well appreciate that inherent mechanical clearances and operational wear can severely affect performance of such a valve and the present invention effectively addresses such challenge. Managing such small stroke travel is another challenge addressed here.

However, it is to be expressly understood that the present invention is particularly expandable to valves of any and bigger size and energy consumption as shall be clear in following paras.

The swiveled valve driven by the non-linear solenoid comprises a bridge mounted solenoid assembly, a compensated swivel fulcrum, a counterweight arrangement and a base unit arrangement having a base unit. The bridge mounted solenoid assembly swivels around an axis.

The bridge mounted solenoid assembly of the swiveled valve comprises a bridge and a solenoid coil assembly.

The solenoid coil assembly is a cylindrical coil disposed in the coil seat while a pair of wire ends channeled through the corresponding wiring routes and via wiring holes to a terminal disposed on the base unit. Since the wires are coming out as close as possible to the pivot, this arrangement facilitates swivel of the bridge mounted solenoid assembly around the axis without a mechanical strain on the pair of wire ends or causing unrequired load on mechanism.

The compensated swiveled fulcrum comprises a slender cylindrical rod, a pair of plurality of spherical balls and a compensating spring at one end. A first end cap assembly encloses and includes the plurality of spherical balls at a first end while a second end cap assembly encloses and includes the plurality of spherical balls at the second end. The slender cylindrical rod has a conical end on either side. Each conical end has a conical surface resting against the plurality of spherical balls.

The counterweight arrangement comprises a counterweight part and a support spring. The counterweight part is disposed at the counterweight end of the bridge, while the support spring is anchored between the counterweight end and an anchor point in the base unit.

The slender cylindrical rod of the compensated swiveled fulcrum is trapped in the fulcrum receptacle of the bridge such that no relative motion is possible between the fulcrum receptacle and the slender cylindrical rod.

The base unit arrangement has a base unit, a cylindrical type permanent magnet, a coil-magnet cap made of a ferrous material, an electrical connection. The base unit has a provision for a flow path having a flow path opening, the flow path connecting a pre-stage path to a main stage path, a limiting pillar, a first fulcrum resting point and a second fulcrum resting point, the anchor point.

The bridge mounted solenoid assembly with the compensated swiveled fulcrum is situated in the first fulcrum resting point and the second fulcrum resting point of the base unit, such that the first end cap assembly is firmly rested while the second end cap assembly is constantly under a pre-load force of the compensating spring. The cylindrical permanent magnet is circumferentially engulfed by the solenoid coil assembly.

When an electric supply is impressed at the electrical terminals the solenoid coil assembly generates a magnetic field and the solenoid coil assembly moves in an arc around the cylindrical type permanent magnet. The stroke length in the present embodiment is required to be less than half a milli-meter and such sub-millimeter stroke is a fraction of an orthogonal movement of the solenoid coil assembly.

Consequent to the movement in the arc, an airgap around the solenoid coil assembly is non-uniform. The solenoid coil assembly has a determined end point of a minimal airgap in collaboration with the counterweight arrangement. The energy consumption is minimized when the solenoid coil assembly is switched on due to the eliminated static friction consequent to damped floating situation of the solenoid coil assembly.

The counterweight arrangement ensures damped floating situation of the solenoid coil assembly independent and irrespective of whatever orientation the swiveled valve is mounted in a field application. This is of immense benefit as it is difficult to always mount a positioner in a particular orientation and a pre-stage valve provided therein is expected to work in all orientations.

It is known that a relative movement between various moving components necessitates a definite minimum gap of few hundred microns, and such a gap varies due to wear, temperature variation and manufacturing variations. The present embodiment being focused on a sub-millimeter stroke length, such variation particularly is of concern and the present invention addresses this challenge as described hereinbelow.

This arrangement particularly addresses a linear variation in a length of the slender cylindrical rod. Thus, the length may increase or decrease due to ambient temperature; or the length may reduce due to a wear between the spherical balls and the conical surface. In the present invention the first end cap assembly is rigidly disposed while the second end cup assembly is floatingly disposed. A compensating spring applies a continuous pre-load force eliminating any minimal gap between the plurality of spherical balls and the conical surface. Importantly, the wear between the spherical balls and the conical surface which would result in axial shift of the slender cylindrical rod and consequently the stroke length; is eliminated by constantly pushing the spherical balls and the corresponding conical surfaces against each other. It is noteworthy that such an arrangement results in an unwanted but harmless lateral resultant movement of the bridge.

The counterweight arrangement keeps the solenoid coil assembly in a damped floating situation and a pickup VA requirement of the solenoid coil assembly is comparable to a hold on VA requirement, both significantly lesser than when the counterweight arrangement isn't provided.

The swiveled valve operation facilitates arriving at a minimal required stroke length without significant increase in corresponding VA consumption.

BRIEF DESCRIPTION OF DRAWINGS

FIG. 6A-6F are views of a compensated swivel fulcrum and its parts.

DETAILED DESCRIPTION OF INVENTION

The present invention shall now be described with the help of accompanying drawings. It is to be expressly understood that the present invention can be worked with several variations and the embodiment described should not be construed to limit the invention in any manner whatsoever.

The present invention is a swiveled valve driven by a non-linear solenoid. The preferred embodiment described is a pre-stage valve, wherein a closing to opening stroke travel of orifice of the pre-stage valve is less than half a millimeter. Person skilled in the art can well appreciate that inherent mechanical clearances and operational wear can severely affect performance of such a valve and the present invention effectively addresses such challenge. Managing such small stroke travel is another challenge addressed here.

However, it is to be expressly understood that the present invention is particularly expandable to valves of any and bigger size and energy consumption as shall be clear in following paras.

Figure 1:
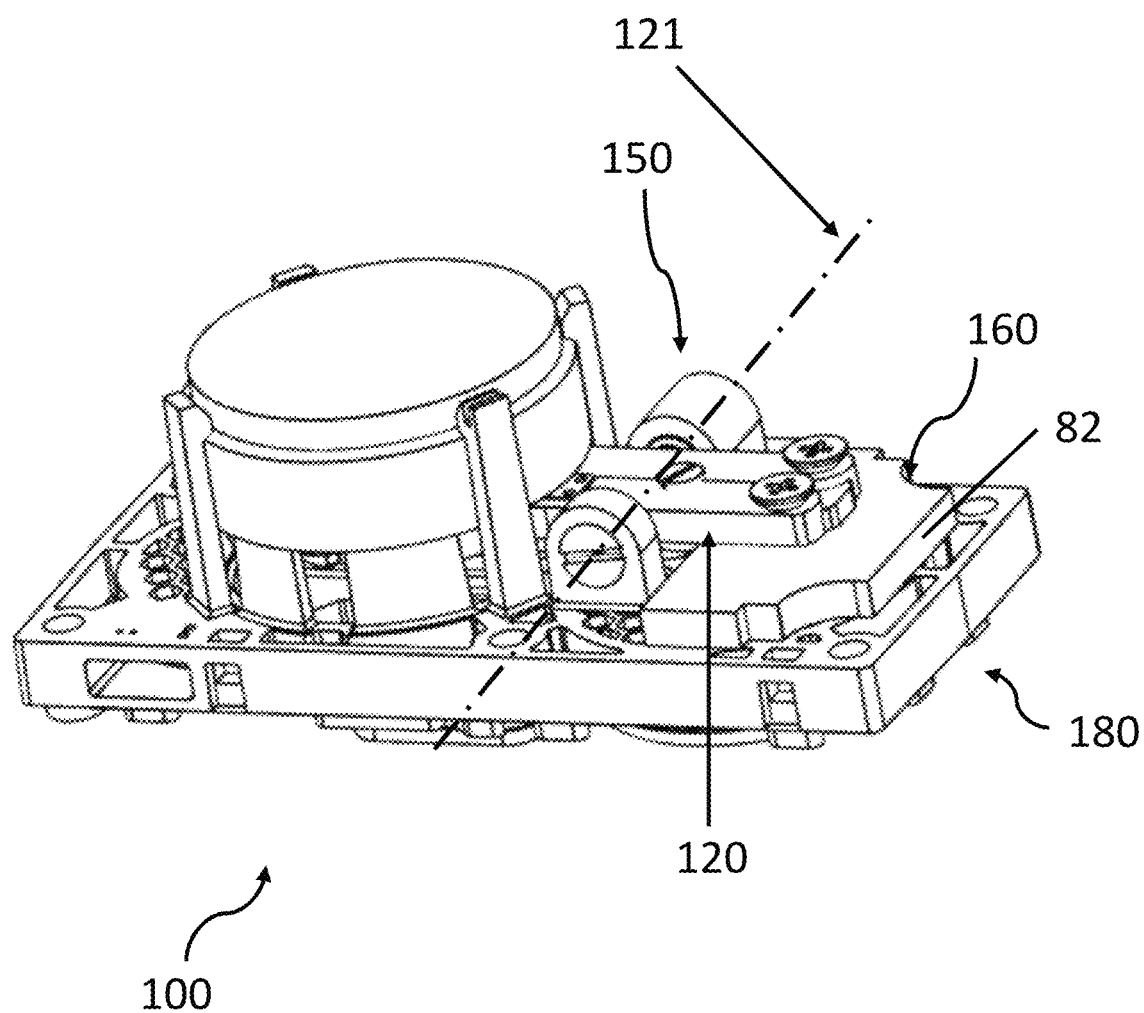
FIG. 1 is a perspective view of a swiveled valve with compensated precision stroke as per present invention.

FIG. 1, 2, the swiveled valve driven by the non-linear solenoid (100) comprises a bridge mounted solenoid assembly (120), a compensated swivel fulcrum (150), a counterweight arrangement (160) and a base unit arrangement (180), having a base unit (190). The bridge mounted solenoid assembly (120) swivels around an axis (121).

Figures 4A, 4B:
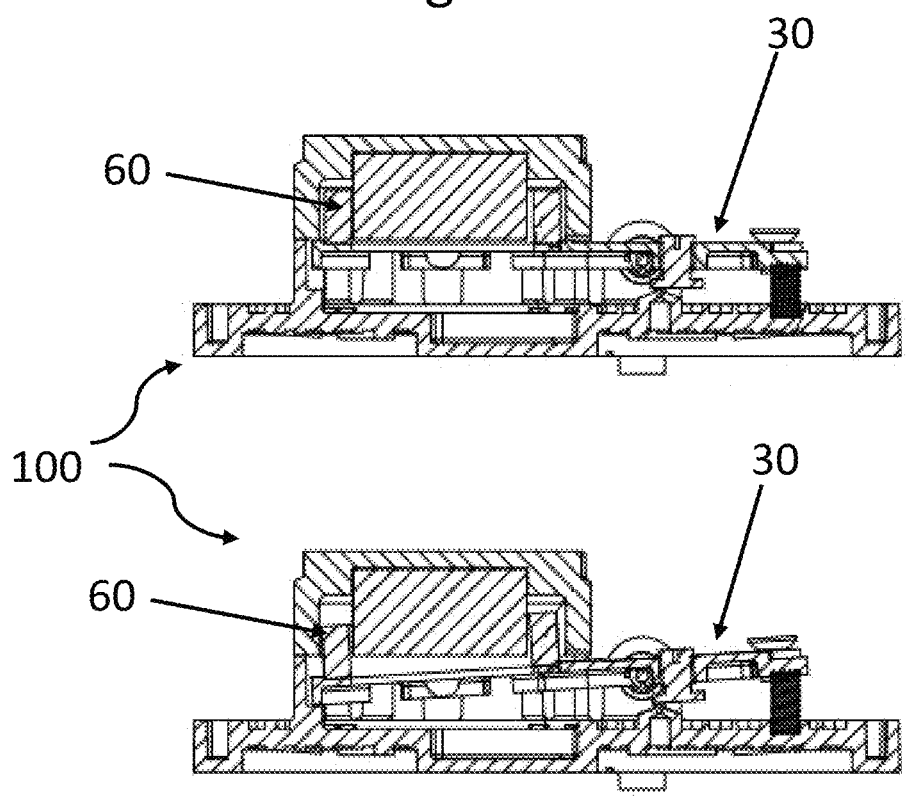
FIGS. 4A and 4B are sections front views showing a swivel of a bridge.

FIG. 4A, 4B, the bridge mounted solenoid assembly (120) of the swiveled valve (100) comprises a bridge (30) and a solenoid coil assembly (60).

Figure 5A:
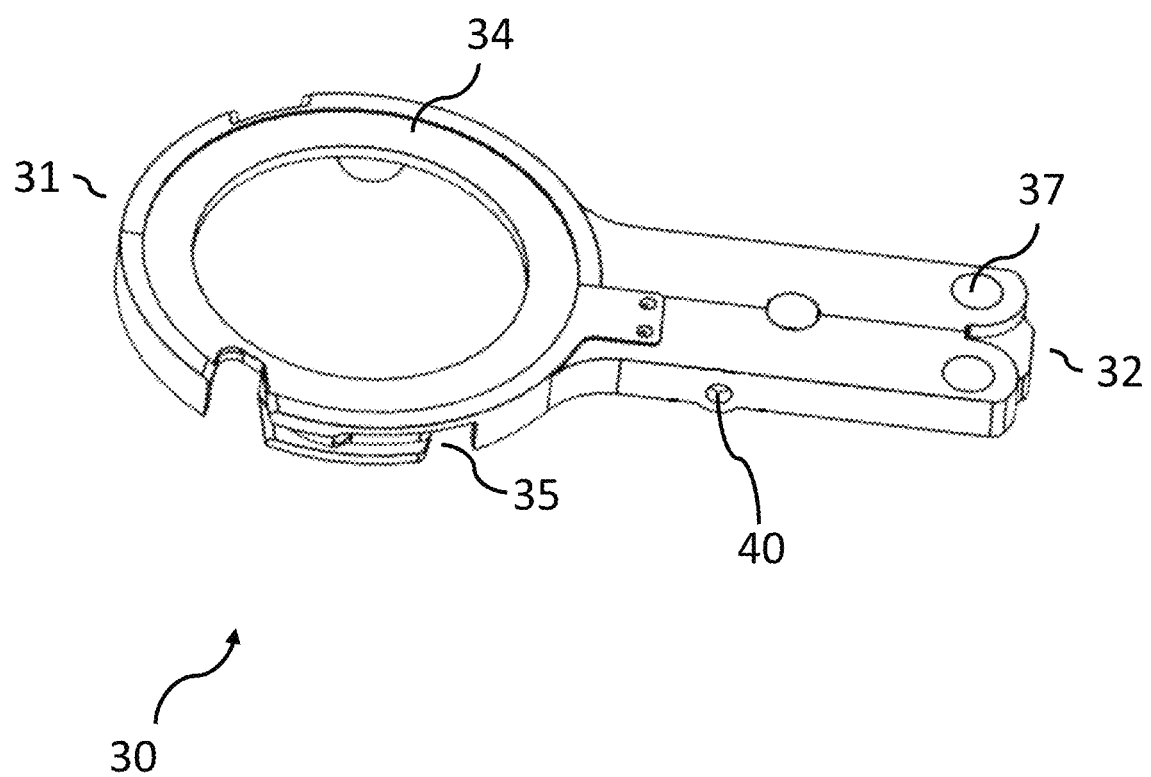
FIGS. 5A and 5B are perspective views of the bridge.
Figure 5B:
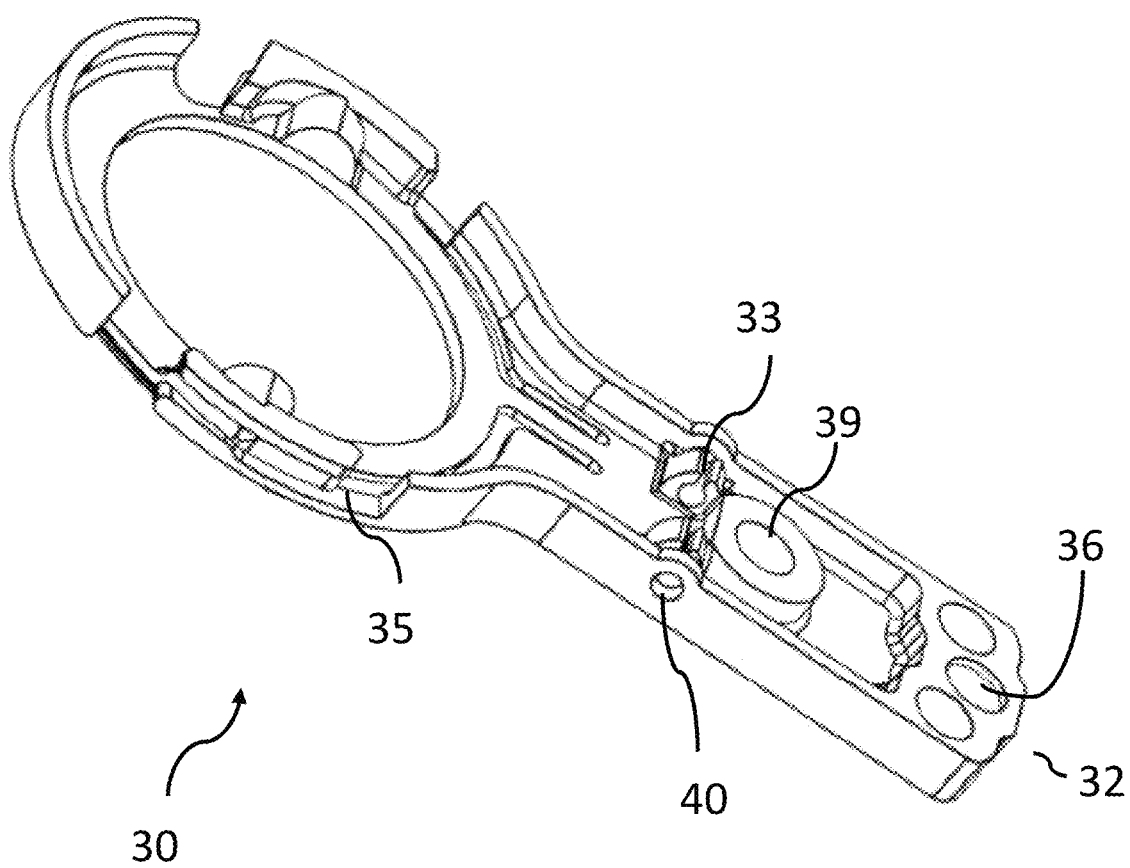

FIG. 5A, 5B, the bridge (30) has a solenoid end (31), a counterweight end (32), a fulcrum receptacle (33). The solenoid end has a coil seat (34) to receive a solenoid coil, and a pair of wiring routes (35). The counterweight end (32) has a spring seat (36) and a counterweight disposing means (37). Between the counterweight end (32) and the fulcrum receptacle is situated a valve head base (39).

The solenoid coil assembly (60) is a cylindrical coil disposed in the coil seat (34) while a pair of wire ends channeled through the corresponding wiring routes (35) and via wiring holes to a terminal (182) disposed on the base unit (190). This arrangement facilitates swivel of the bridge mounted solenoid assembly (120) around the axis (121) without a mechanical strain on the pair of wire ends. The mechanical strain is particularly and virtually eliminated since the wiring holes on the bridge (30) are situated near the compensated swiveled fulcrum (150). Consequently, the wire movement is least when the bridge (30) swivels, and this minimizes the stress on wire and also reduces movement of wires which consequently do not resist the movement nor add operational load.

Figure 6A:
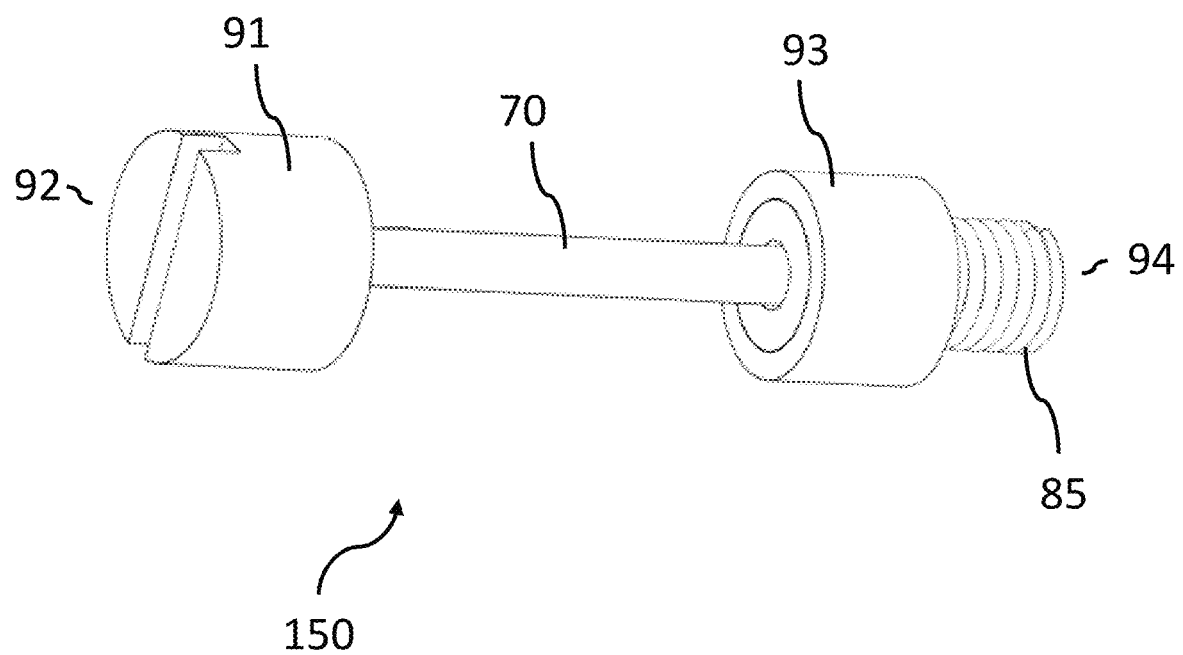
Figure 6B:
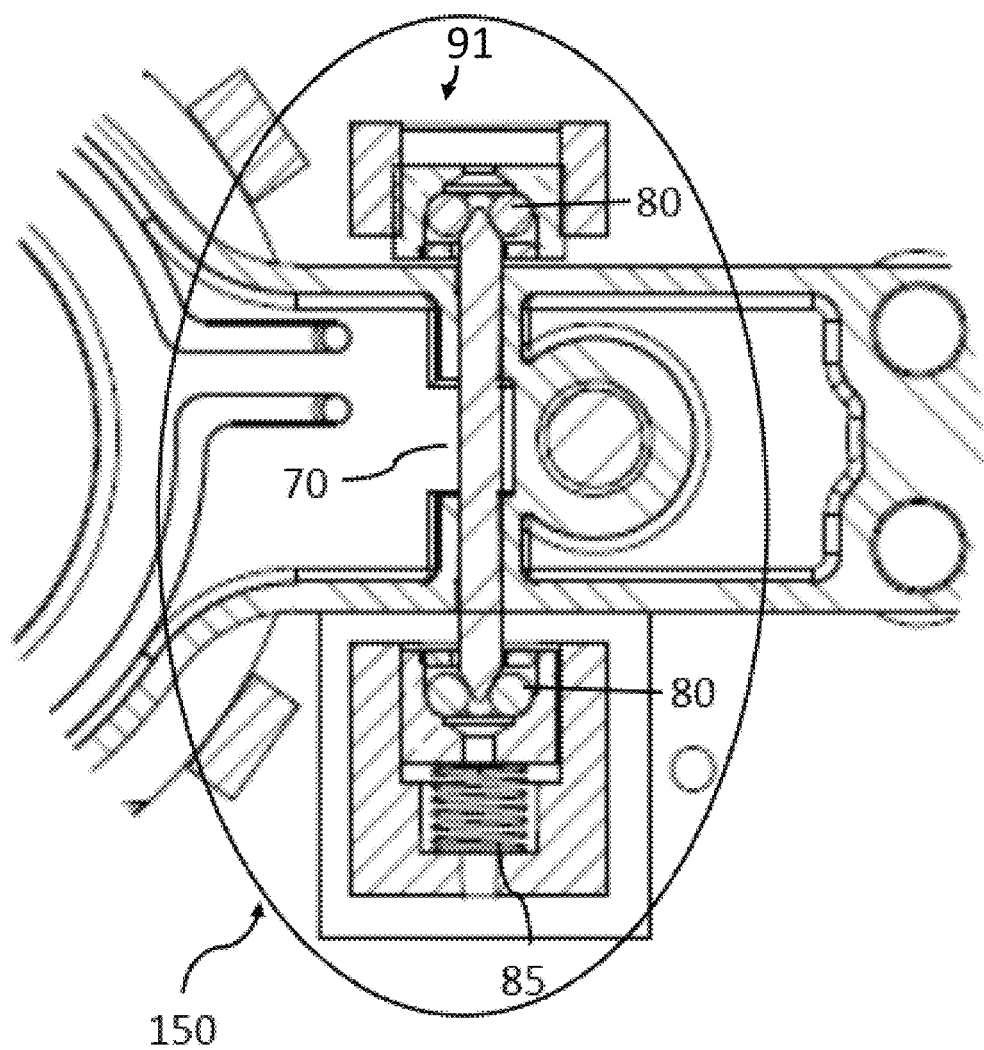

FIG. 6A, 6B, the compensated swiveled fulcrum (150) comprises a slender cylindrical rod (70), a pair of plurality of spherical balls (80) and a compensating spring (85) at one end. A first end cap assembly (91) encloses and includes the plurality of spherical balls (80) at a first end (92) while a second end cap assembly (93) encloses and includes the plurality of spherical balls at the second end (94). The slender cylindrical rod (70) and the plurality of spherical balls (80) are of a compatible hardness.

Figure 6E:
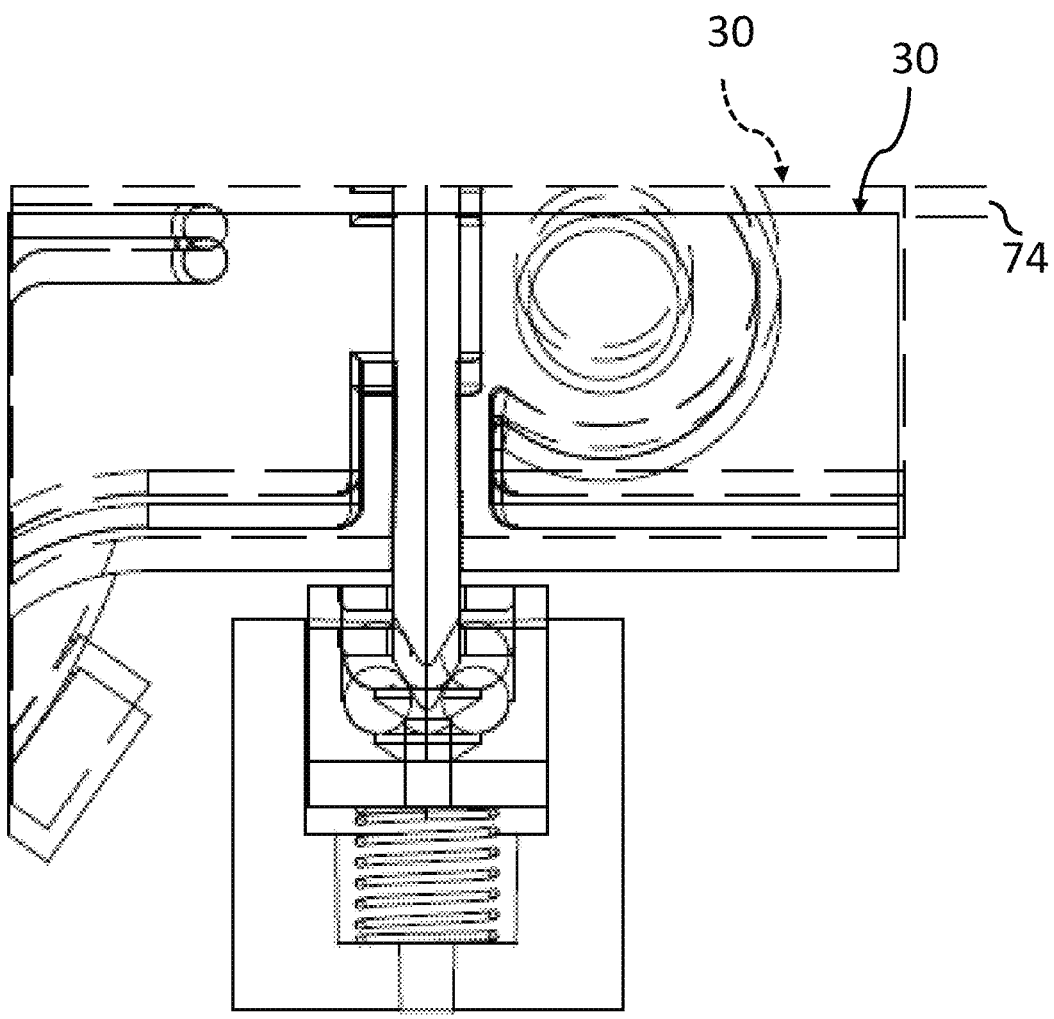
Figure 6F:
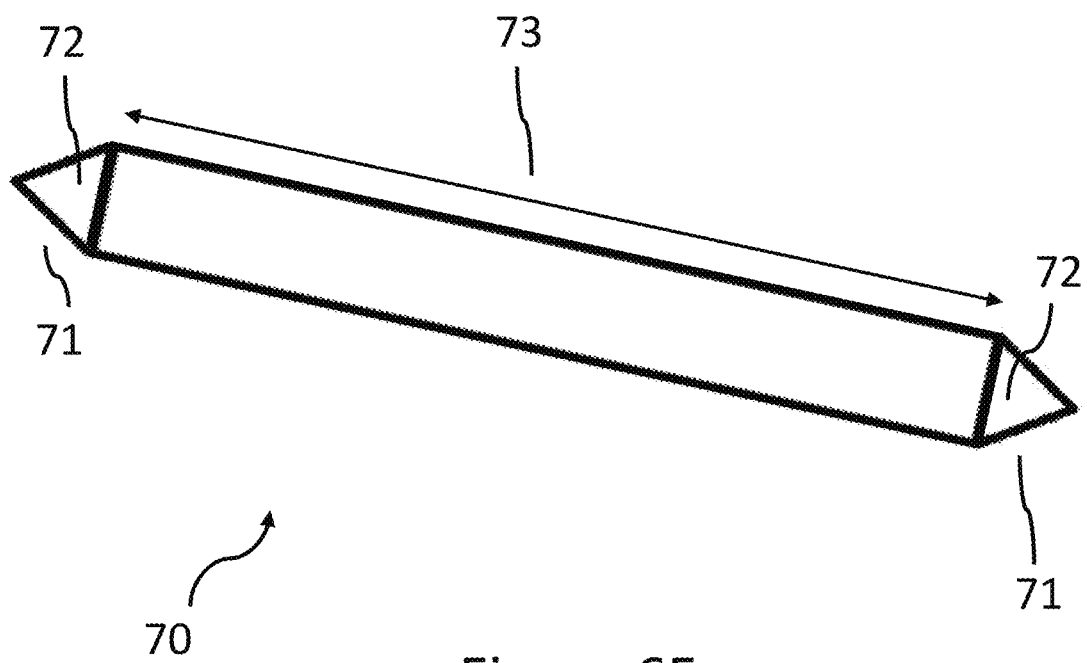
Figure 7A:
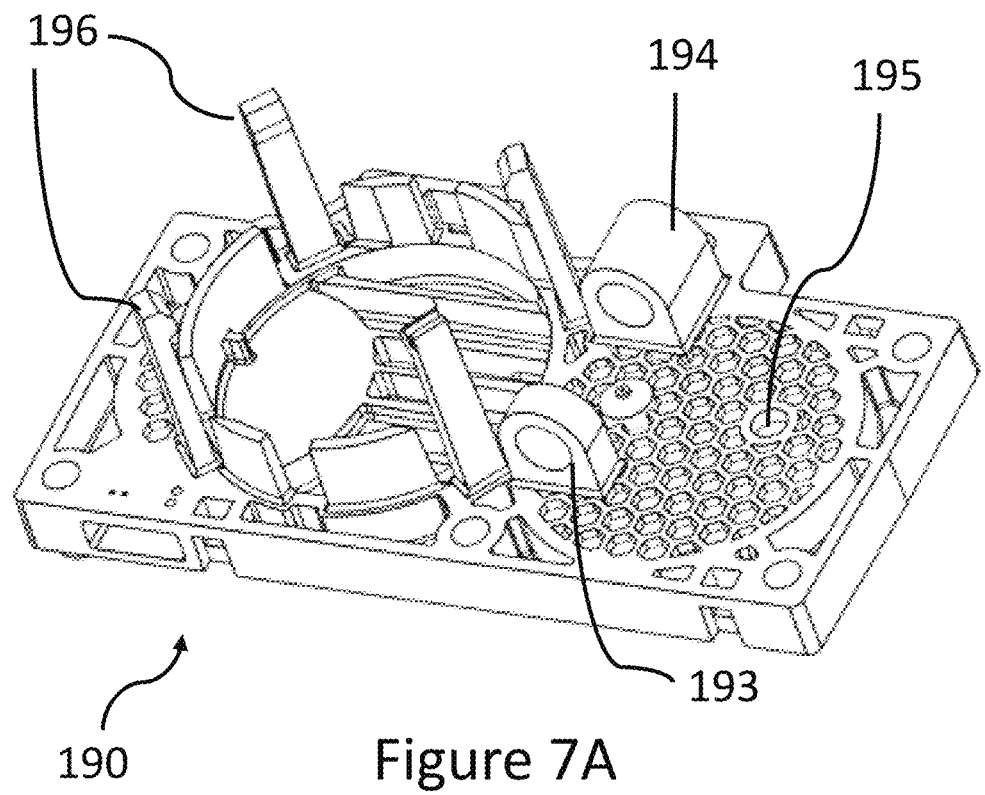
FIGS. 7A and 7B are a perspective view and a part view of a base unit.
Figure 7B:
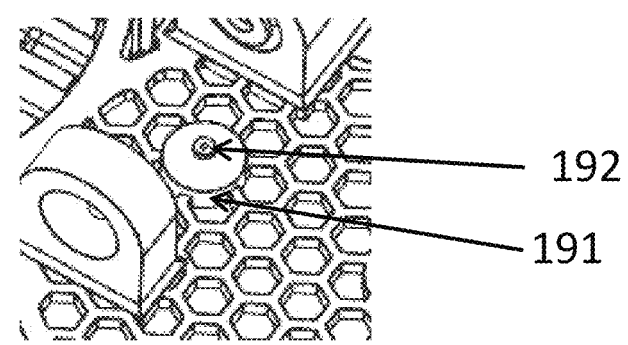
Figure 8A:
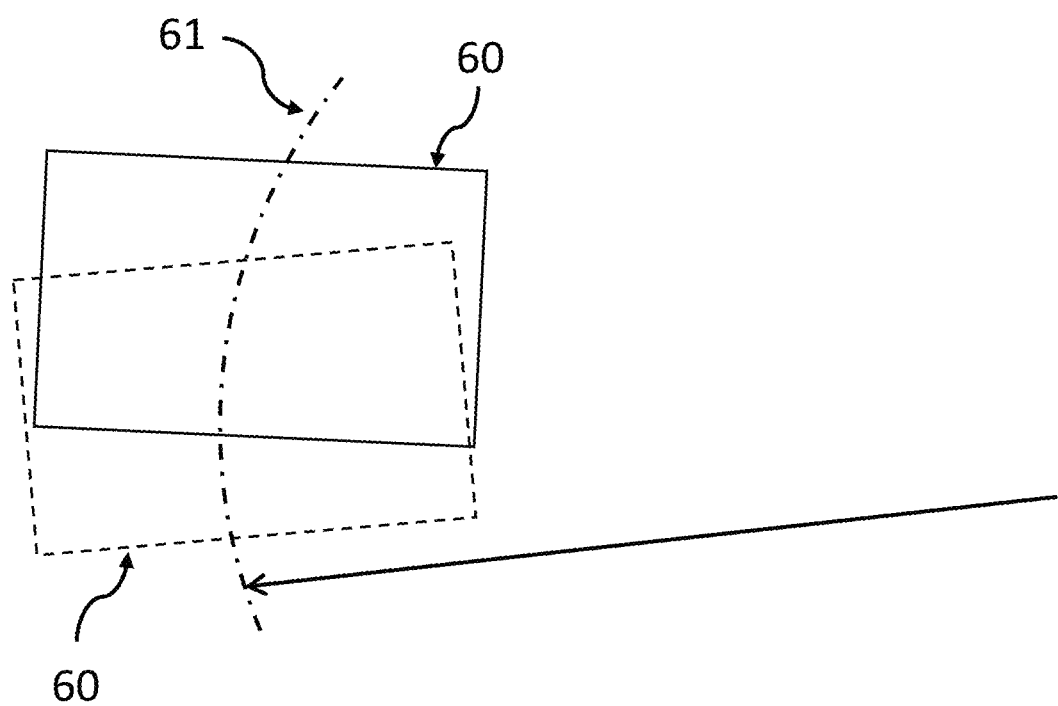
FIGS. 8A, 8B and 8C show an arc movement of a solenoid coil.
Figure 8B:
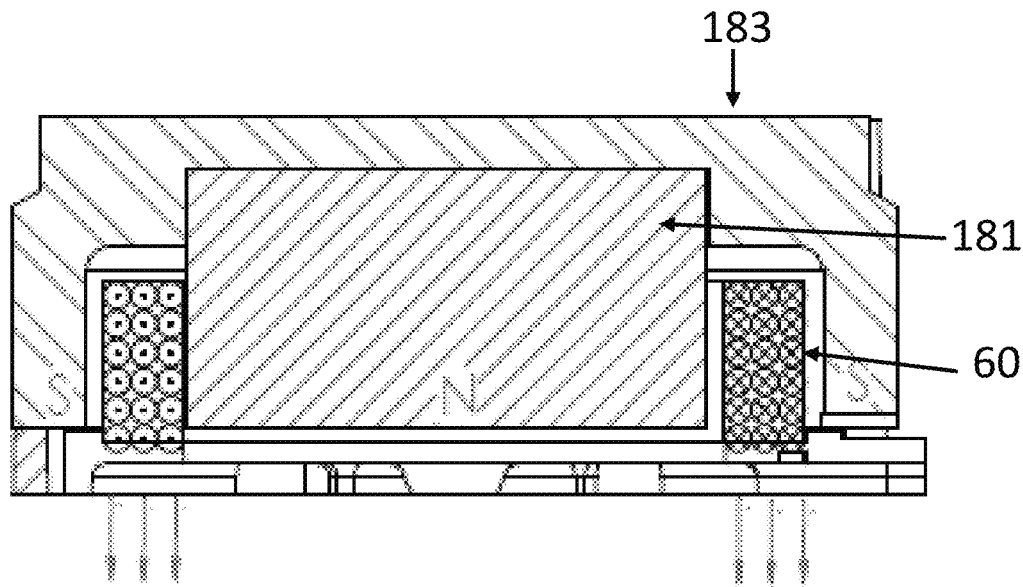
Figure 8C:
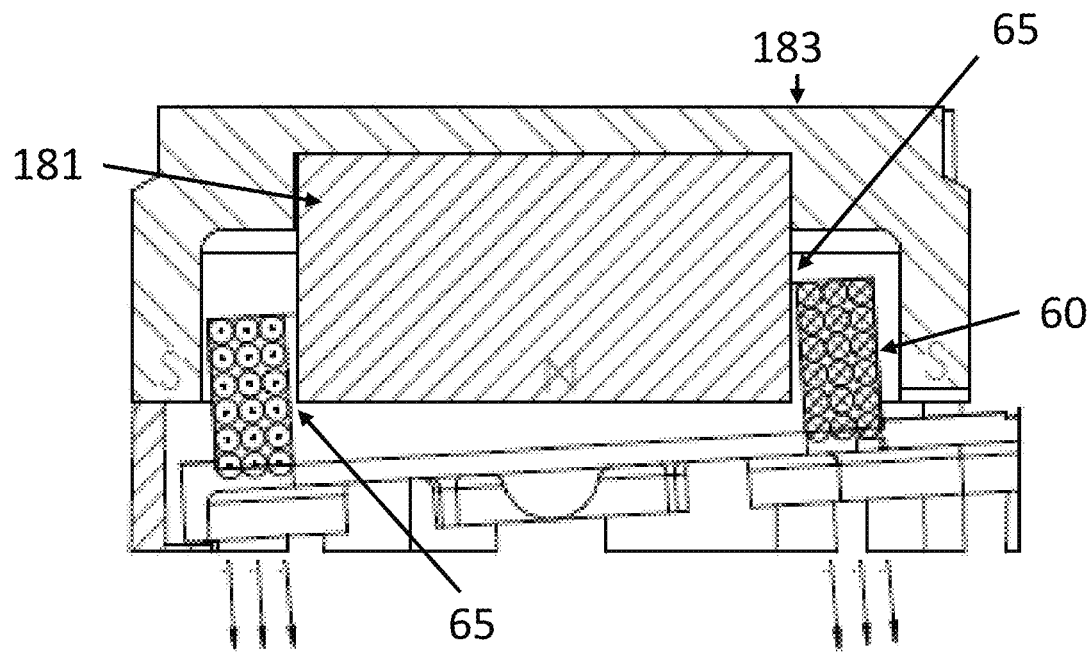

FIG. 6F, the slender cylindrical rod (70) has a conical end (71) on either side. Each conical end (71) has a conical surface (72) resting against the plurality of spherical balls (80).

Figure 2:
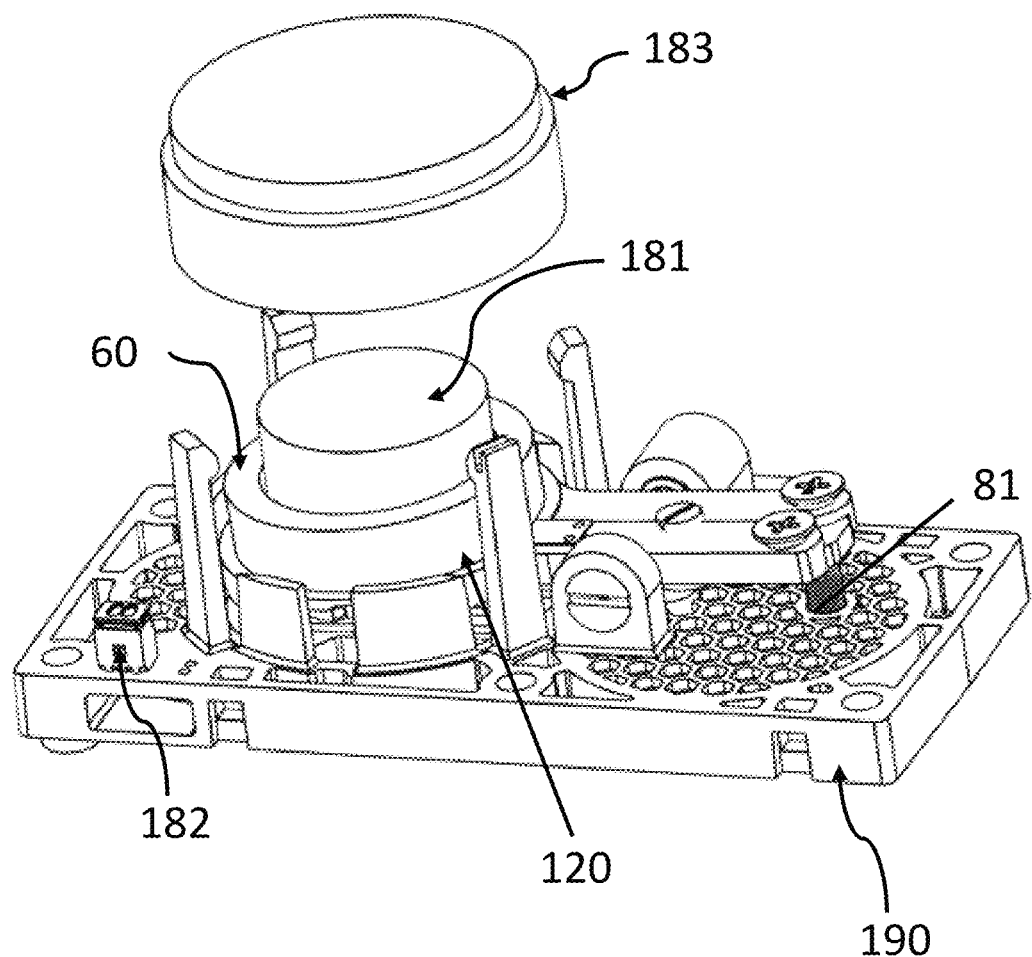
FIG. 2 is another perspective view of the swiveled valve with compensated precision stroke.
Figure 9:
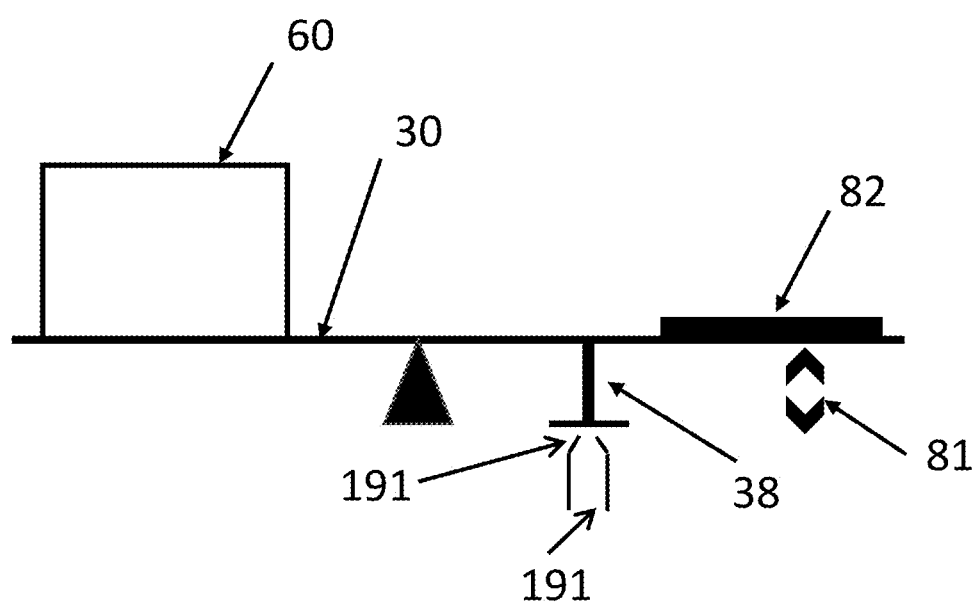
FIG. 9 is a line diagram of the swivel arrangement of the present invention.
Figure 10:
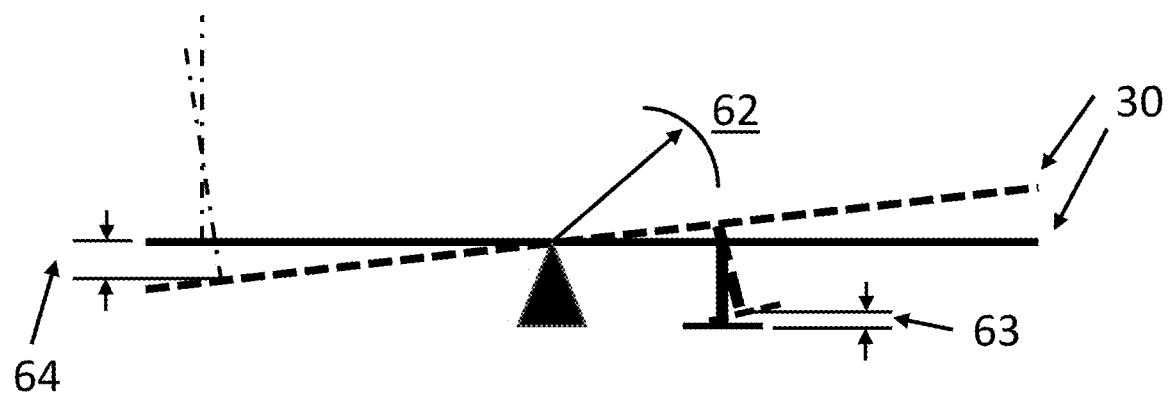
FIG. 10 is a line diagram showing swiveling parameters of the present invention.

FIGS. 1, 2 and 9, the counterweight arrangement (160) comprises a counterweight part (82) and a support spring (81). The counterweight part (82) is disposed at the counterweight end (32) of the bridge (30), while the support spring (81) is anchored between the counterweight end (32) and an anchor point (195) in the base unit (190).

The slender cylindrical rod (70) of the compensated swiveled fulcrum (150) is trapped in the fulcrum receptacle (33) of the bridge (30) such that no relative motion is possible between the fulcrum receptacle (33) and the slender cylindrical rod (70); while the slender cylindrical rod (70) passes clearly through the clearance holes (40) on either side of the bridge (30), FIG. 1, 2, 7A, 7B, the base unit arrangement (180) has a base unit (190), a cylindrical type permanent magnet (181), a coil-magnet cap (183) made of a ferrous material, an electrical connection (182). The base unit (190) has a provision for a flow path (191) having a flow path opening (192), the flow path (191) connecting a pre-stage path to a main stage path, a limiting pillars (196), a first fulcrum resting point (193) and a second fulcrum resting point (194), the anchor point (195).

The bridge mounted solenoid assembly (120) with the compensated swiveled fulcrum (150) is situated in the first fulcrum resting point (193) and the second fulcrum resting point (194) of the base unit (190), such that the first end cap assembly (91) is firmly rested while the second end cap assembly (93) is constantly under a pre-load force of the compensating spring (85). The cylindrical permanent magnet (181) is circumferentially engulfed by the solenoid coil assembly (60). The cylindrical permanent magnet (181) is non-movably secured under the coil-magnet cap (183), held in place by a limiting pillars (196) of the base unit (190).

FIG. 8A, 8B, 8C, 10 when an electric supply is impressed at the electrical terminals the solenoid coil assembly (60) generates a magnetic field and the solenoid coil assembly (60) moves in an arc (61) around the cylindrical type permanent magnet (181). The stroke length in the present embodiment is required to be less than half a milli-meter and such sub-millimeter stroke (63) is a fraction of an orthogonal movement (64) of the solenoid coil assembly (60).

Consequent to the movement in the arc (61), an airgap around the solenoid coil assembly is non-uniform. The solenoid coil assembly (60) has a determined end point of a minimal airgap (65) in collaboration with the counterweight arrangement (160). The energy consumption is minimized when the solenoid coil assembly is switched on due to the eliminated static friction consequent to damped floating situation of the solenoid coil assembly (60). This collaborative feature facilitates application of the present invention for valves of bigger size and energy.

The counterweight arrangement (160) ensures damped floating situation of the solenoid coil assembly (60) independent and irrespective of whatever orientation the swiveled valve (100) is mounted in a field application. This is of immense benefit as it is difficult to always mount a positioner in a particular orientation and a pre-stage valve provided therein is expected to work in all orientations.

Figure 3:
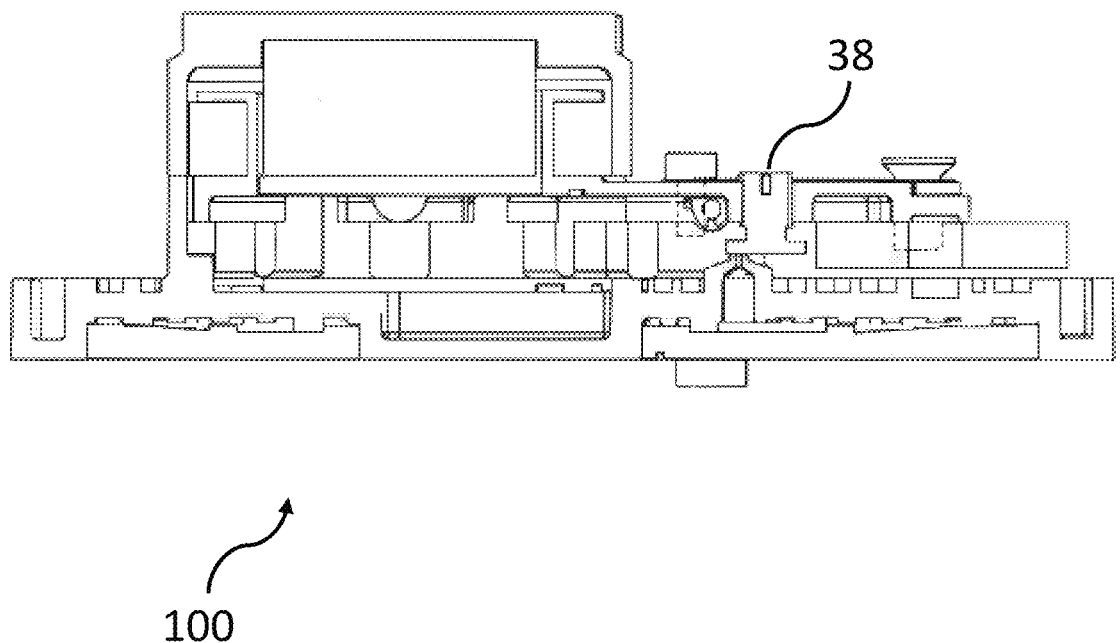
FIG. 3 is a sectional front view of the swiveled valve showing a valve head of the swiveled valve.

FIG. 3, 10, the valve head (38) also moves in an arc (62) and closes/opens the valve.

It is known that a relative movement between various moving components necessitates a definite minimum gap of few hundred microns, and such a gap varies due to wear, temperature variation and manufacturing variations. The present embodiment being focused on a sub-millimeter stroke length, such variation particularly is of concern and the present invention addresses this challenge as described hereinbelow.

This arrangement particularly addresses a linear variation in a length (73) of the slender cylindrical rod (70), FIG. 6F. Thus, the length (73) may increase or decrease due to ambient temperature; or the length (73) may reduce due to a wear between the spherical balls (80) and the conical surface (72). In the present invention the first end cup assembly (91) is rigidly disposed while the second end cup assembly (93) is floatingly disposed, FIG. 6C, 6D. A compensating spring (85) applies a continuous pre-load force eliminating any minimal gap between the plurality of spherical balls (80) and the conical surface (72). Importantly, the wear between the spherical balls (80) and the conical surface (72) which would result in axial shift of the slender cylindrical rod (70) and consequently the stroke length; is eliminated by constantly pushing the spherical balls (80) and the corresponding conical surfaces (72) against each other. Such feature facilitates application of the present invention for valves of bigger size and energy, requiring precision in operation.

FIG. 6E, it is noteworthy that such an arrangement results in an unwanted but harmless lateral resultant movement (74) of the bridge (30).

The counterweight arrangement (160) keeps the solenoid coil assembly (60) in a damped floating situation and a pickup VA requirement of the solenoid coil assembly (60) is comparable to a hold on VA requirement, both significantly lesser than when the counterweight arrangement (160) isn't provided. Such feature facilitates application of the present invention for valves of bigger size and minimum energy per unit size valve.

The swiveled valve operation facilitates arriving at a minimal required stroke length without significant increase in corresponding VA consumption. Such feature facilitates application of the present invention for valves of bigger size and reduced energy.

Figure 11A:
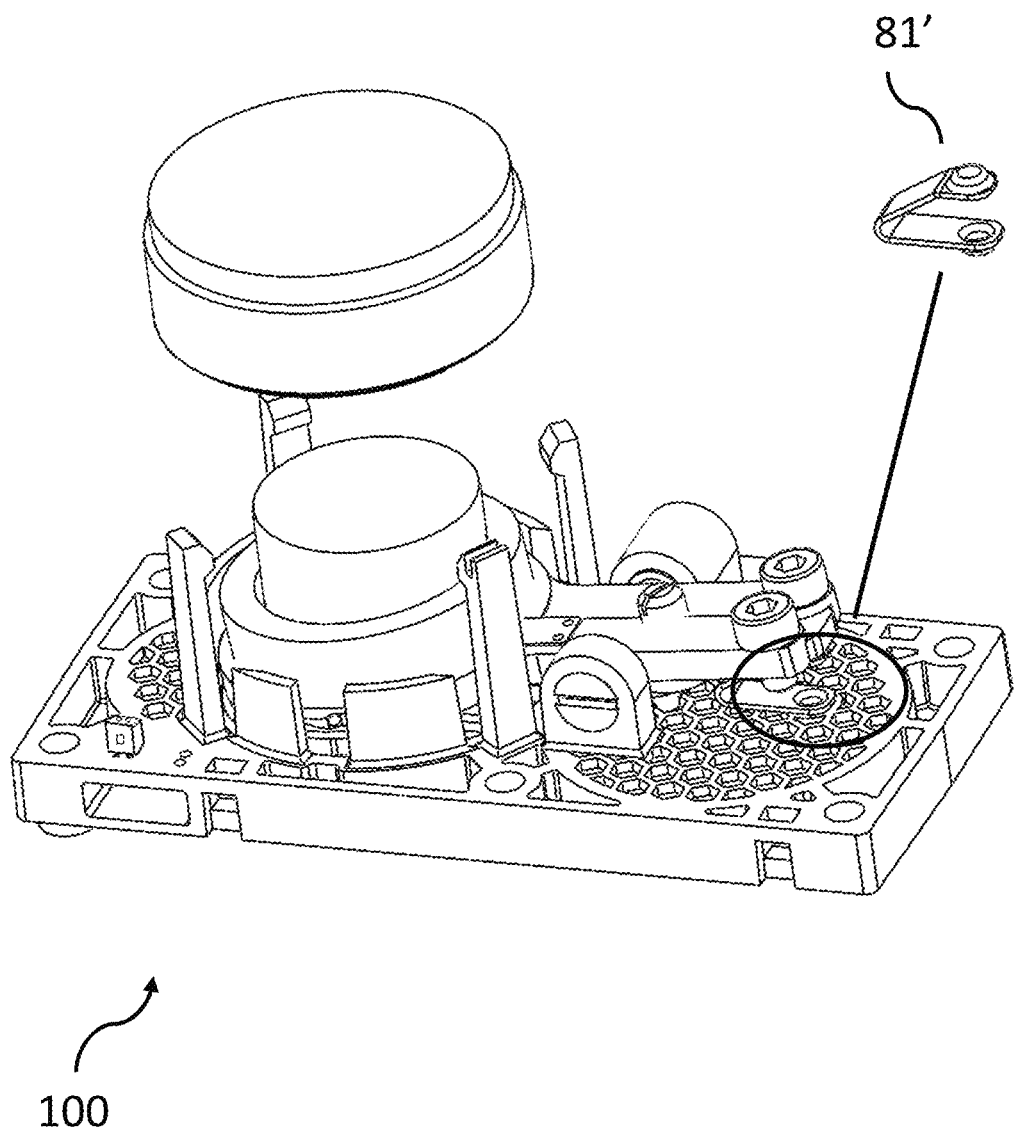
FIGS. 11A, 11B and 11C are perspective views of different embodiments of springs deployable in the compensated precision stroke according to alternate embodiments of the invention
Figure 11B:
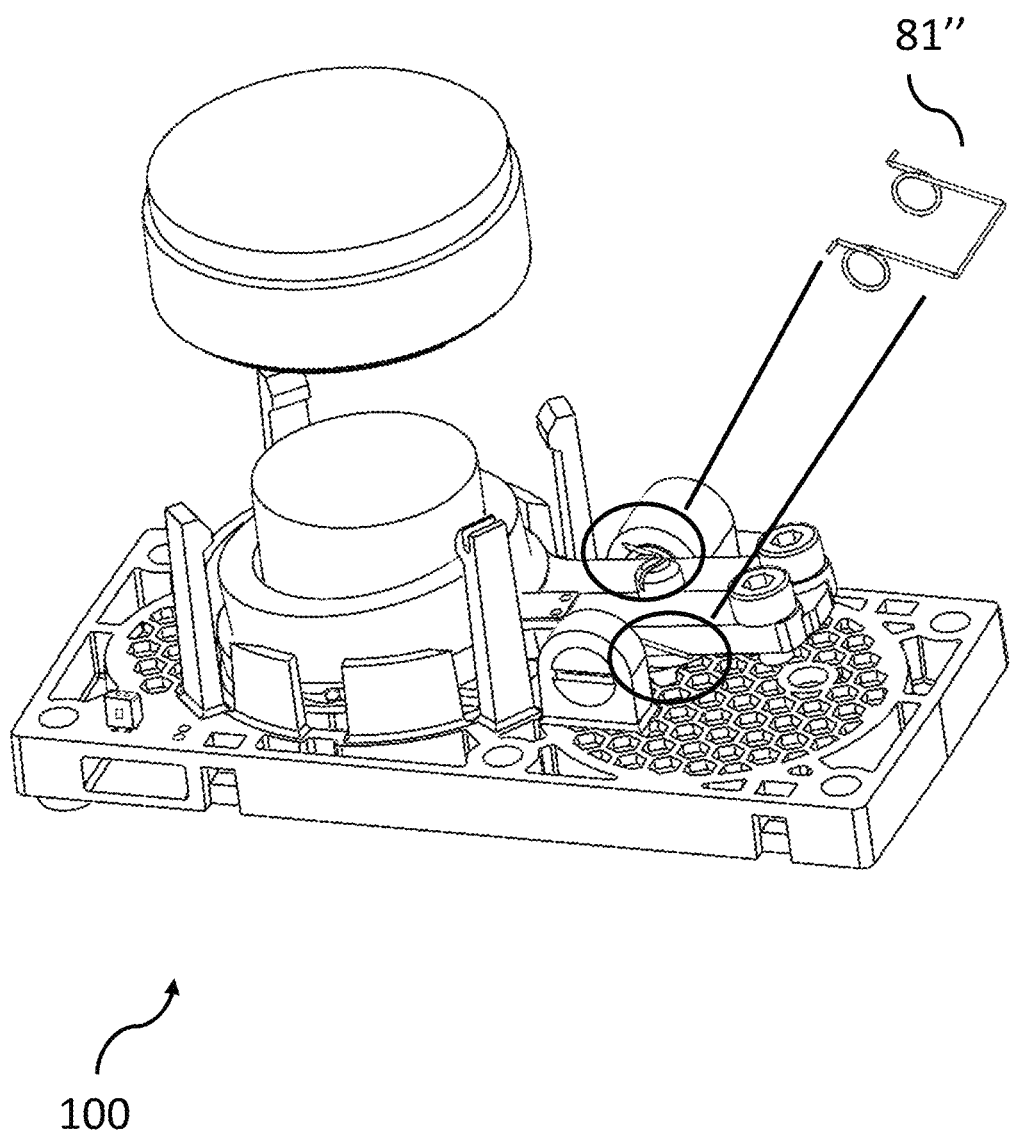
Figure 11C:
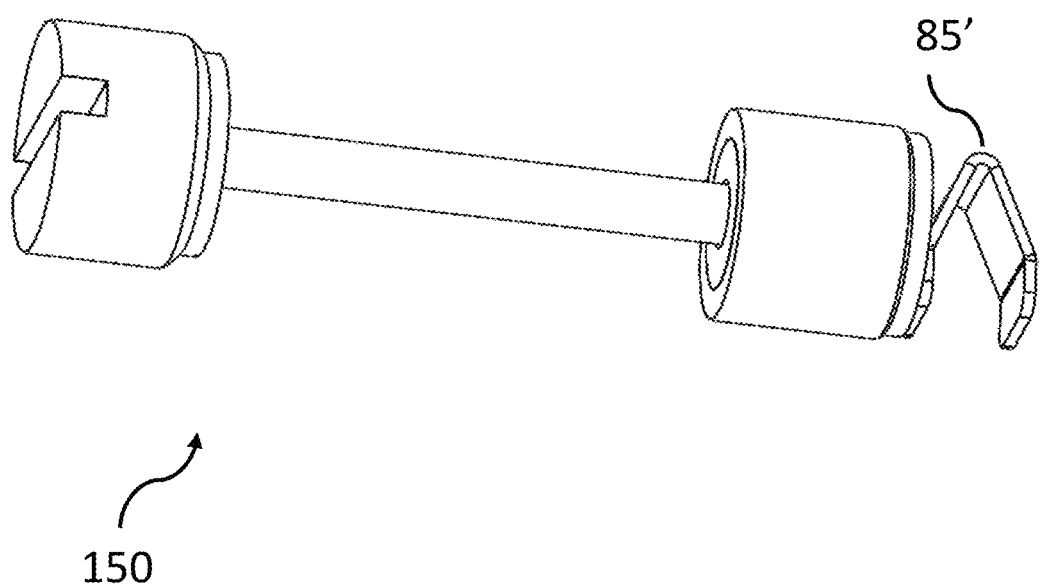

In the preferred embodiment, a compression spring (81), (85) is shown, however, as a variation, a torsion spring (81") or a leaf spring (81'), (85') is correspondingly providable, FIG. 11A, 11B, 11C.

The permanent magnet in the preferred embodiment is a cylindrical type permanent magnet, however, as a variation the magnet may be of any shape.

I claim:

1. A swiveled valve with a compensated precision stroke (100), comprising a solenoid coil assembly (60), a permanent magnet (181), characterized in that the swiveled valve (100) comprises:
   a bridge mounted solenoid assembly (120) having a bridge (30) and the solenoid coil assembly (60),
   a compensated swivel fulcrum (150) comprising a first end cap assembly (91) and a second end cap assembly (93), having
   a slender cylindrical rod (70) with a conical end (71) at each end having a conical surface (72),
   a pair of plurality of spherical balls (80), and
   a compensating spring
   a counterweight arrangement (160) having a counterweight part (82) and a support spring and
   a base unit arrangement (180) having a base unit (190), wherein
the slender cylindrical rod (70) of the compensated swiveled fulcrum (150) is non-rotatably trapped in a fulcrum receptacle of the bridge (30), the compensating spring (85) continuously presses the pair of the plurality of spherical balls (80) against the conical surface (72) of the slender cylindrical rod (70), the bridge mounted solenoid assembly (120) swivels around an axis(121), an electric supply impressed at electrical terminals of the solenoid coil assembly (60) generates a magnetic field and the solenoid coil assembly (60) moves in an arc (61) around the permanent magnet (181), the counterweight arrangement (160) keeps the solenoid coil assembly (60) in a damped floating situation when unenergized, the swiveled valve with a compensated precision stroke (100) mountable in any orientation.

2. The swiveled valve with the compensated precision stroke (100) as claimed in claim 1, wherein the bridge (30) has a solenoid end (31), a counterweight end (32), a fulcrum receptacle (33), the solenoid end has a coil seat (34) to receive the solenoid coil assembly (60), and a pair of wiring routes (35), the counterweight end (32) has a spring seat (36) and a counterweight disposing means (37), between the counterweight end (32) and the fulcrum receptacle issituated a valve head base (39).

3. The swiveled valve with the compensated precision stroke (100) as claimed in claim 1, wherein the base unit (190) has a provision for a flow path (191) having a flow path opening (192), the flow path (191) connecting a prestage path to a main stage path, a limiting pillars (196), a first fulcrum resting point (193) and a second fulcrum resting point (194), an anchor point (195).

4. The swiveled valve with the compensated precision stroke (100) as claimed in claim 1, wherein the base unit (190) has a first end cap assembly (91) enclosing and including the plurality of spherical balls (80) at a first end (92), and a second end cap assembly (93) enclosing and including the plurality of spherical balls (80) at the second end (94).

5. The swiveled valve with the compensated precision stroke (100) as claimed in claim 1, wherein the counterweight part (82) is disposed at the counterweight end (32) of the bridge (30), while the support spring (81) is anchored between the counterweight end (32) and an anchor point (195) in the base unit (190).

6. The swiveled valve with the compensated precision stroke (100) as claimed in claim 1, wherein the bridge mounted solenoid assembly (120) with the compensated swiveled fulcrum (150) is situated in the first fulcrum resting point (193) and the second fulcrum resting point (194) of the base unit (190), such that the first end cap assembly (91) is rigidly disposed while the second end cap assembly (93) is floatingly disposed and constantly under a pre-load force of the compensating spring (85), the permanent magnet (181) is circumferentially engulfed by the solenoid cod assembly (60), the permanent magnet (181) is non-movably secured under the coil-magnet cap (183), held in place by the limiting pillars (196) of the base unit (190).

7. The swiveled valve with the compensated precision stroke (100) as claimed in claim 1, wherein the compensating spring is any one of a compression spring (85), or a leaf spring (85').

8. The swiveled valve with the compensated precision stroke (100) as claimed in claim 1, wherein the support spring is any one of a compression spring (81), a leaf spring (81') or a torsion spring (81").

9. The swiveled valve with the compensated precision stroke (100) as claimed in claim 1, wherein the permanent magnet (181) is a cylindrical type magnet.

10. The swiveled valve with the compensated precision stroke (100) as claimed in claim 1, wherein the second end cap assembly (93) being floatingly disposed causes a lateral resultant movement (74) of the bridge (30).

11. The swiveled valve with the compensated precision stroke (100) as claimed in claim 1, wherein the swiveled valve is a pre-stage valve with a compensated sub-millimeter stroke (63).

12. The swiveled valve with the compensated precision stroke (100) as claimed in claim 11, wherein the sub-millimeter stroke (63) is a fraction of an orthogonal movement of the solenoid coil assembly (60).

\* \* \* \* \*